United States Patent [19]
Delatorre

[11] Patent Number: 4,765,184
[45] Date of Patent: Aug. 23, 1988

[54] HIGH TEMPERATURE SWITCH

[76] Inventor: Leroy C. Delatorre, 11 Crestwood, Sugar Land, Tex.

[21] Appl. No.: 842,524

[22] Filed: Feb. 25, 1986

[51] Int. Cl.[4] .................................... E21B 47/00
[52] U.S. Cl. ..................................... 73/151; 307/491
[58] Field of Search ........................ 73/151, 708, 718; 307/491, 571, 572, 591, 310, 118; 340/870.37; 324/61 CD; 361/283

[56] References Cited

U.S. PATENT DOCUMENTS

| 4,091,683 | 5/1978 | Delatorre | 73/718 |
| 4,387,601 | 6/1983 | Azegami | 73/718 X |
| 4,398,426 | 8/1983 | Park et al. | 73/708 X |
| 4,404,481 | 9/1983 | Ide et al. | 307/491 |
| 4,459,856 | 7/1984 | Ko et al. | 73/708 X |
| 4,467,655 | 8/1984 | Lee | 73/708 X |
| 4,472,648 | 9/1984 | Prentice | 307/571 |
| 4,544,854 | 10/1985 | Ulmer et al. | 307/572 X |
| 4,622,480 | 11/1986 | Uchimura et al. | 307/491 |

FOREIGN PATENT DOCUMENTS 0108603  5/1984  European Pat. Off. ............ 307/572

Primary Examiner—Michael J. Tokar

[57] ABSTRACT

Downhole well bore pressure sensor capacitances for detecting pressure in a borehole and for developing electrical signals as a function of pressure. FET devices are connected between sensor capacitances and an oscillator where the oscillator is actuated by a sensor capacitance input to switch between pre-set voltage levels. Each sensor capacitance serves to sense a different parameter and the use of FET devices as switches alternately couples the capacitances to the oscillator which produces frequency signals where the frequency of each signal is the representation of the parameter from each capacitance. The FET devices are interconnected so that the stray capacitances and leakage currents inherent in such devices are eliminated by a unity gain amplifier which dynamically balances the potential due to capacitance and current leakage across the various elements of the FET devices.

7 Claims, 3 Drawing Sheets

HIGH TEMPERATURE SWITCH

FIELD OF INVENTION

This invention relates to electronic switching systems, and more particularly, to field effect transistors (FET) utilized for switching capacitance measuring devices utilized in oil well pressure measuring systems under high temperature conditions.

BACKGROUND OF THE PRESENT INVENTION

In oil field operations, pressure sensing tools are utilized in downhole operation for measuring pressure in a well bore. These tools typically involve a pressure tight housing in which pressure in the borehole operates a capacitance measuring system in the tool for developing signals representative of downhole pressure. Prior art systems are set forth and explained in my prior U.S. Pat. No. 4,091,683, issued May 30, 1978.

The problem which the present invention addresses is the fact that FET devices are temperature responsive in that increasing the temperature of operation causes current leakage which can either causes inaccuracy in the measurements at downhole temperatures or failure of the systems to operate.

SUMMARY OF THE PRESENT INVENTION

The present invention utilizes downhole well bore pressure sensor capacitances for detecting pressure in a borehole and for developing electrical signals as a function of pressure. FET devices are connected between sensor capacitances and an oscillator where the oscillator is actuated by a sensor capacitance input to switch between pre-set voltage levels. Each sensor capacitance serves to sense a different parameter and the use of FET devices as switches alternately couples the capacitances to the oscillator which produces frequency signals where the frequency of each signal is the representation of the parameter from each capacitance. The FET devices are interconnected so that the stray capacitances and leakage currents inherent in such devices are eliminated by a unity gain amplifier which dynamically balances the potential due to capacitance and current leakage across the various elements of the FET devices.

DESCRIPTION OF THE PRESENT INVENTION

Figure 1:
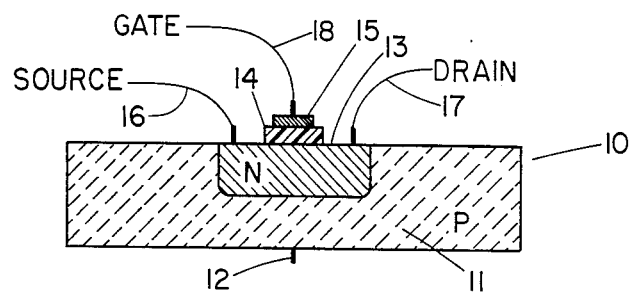
FIG. 1 is a representation in cross-section of a conventional FET device.

Referring first to FIG. 1, an enhancement field effect transistor 10 (FET) is illustrated. The transistor 10 has a substrate 11 such as a "p" type silicon which is formed in a block and an electrical connection 12 connected to the back surface of the substrate. In the front surface of the substrate is a well or recess in which an "n" type silicon 13 is deposited. Centrally of the "n" type silicon 13 is a glass insulator material 14 which is exteriorly coated with a conductive metal 15. An electrical connection 16 connects to one side of the material 14 as a source connection S; an electrical connector 17 connects to an opposite side of the material as a drain connection D, an electrical connector 18 connects to the metal 15 as a gate connection G. In operation, current flow between the source S and drain D is controlled by the voltage potential applied to the gate G so that electrical control of the gate G permits a gating function of "on" or "off" conditions. At ambient temperature, the device functions without significant current distortion. However, in borehole use where the temperatures can run up to 400° F., the activity in the semi-conductor material in the FET is such that additional current will leak between the source and drain and between the substrate and drain and thus cause additional current flow which affects measurements based on current or can develop current magnitudes outside of the operational range of the circuit design. The glass insulator 14 is generally effective to prevent current leakage from the gate, and thus the principal concern is current leakage between the source/drain and the substrate/drain. Also, the FET devices have stray capacitances which occur between the various elements of the FET which cause an inaccuracy in measurements.

Figure 2:
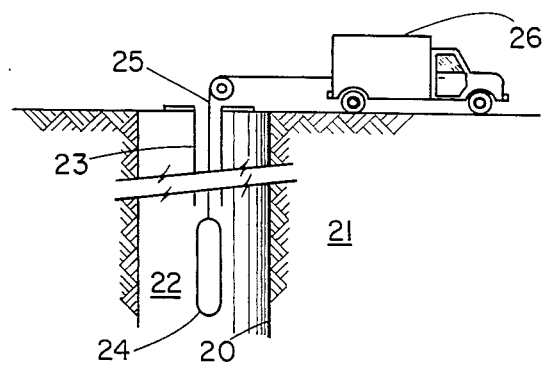
FIG. 2 is a representation of a pressure sensing device in a well bore.

Referring now to FIG. 2, a well bore 20 traverses earth formations 21 and produces hydrocarbons 22 through a tubing string 23 to the earths surface. A pressure gauge 24 is suspended in the well bore by a wireline 25 connected to surface equipment in a truck 26. The borehole hydrocarbons are at in-situ pressure and temperature.

Figure 3:
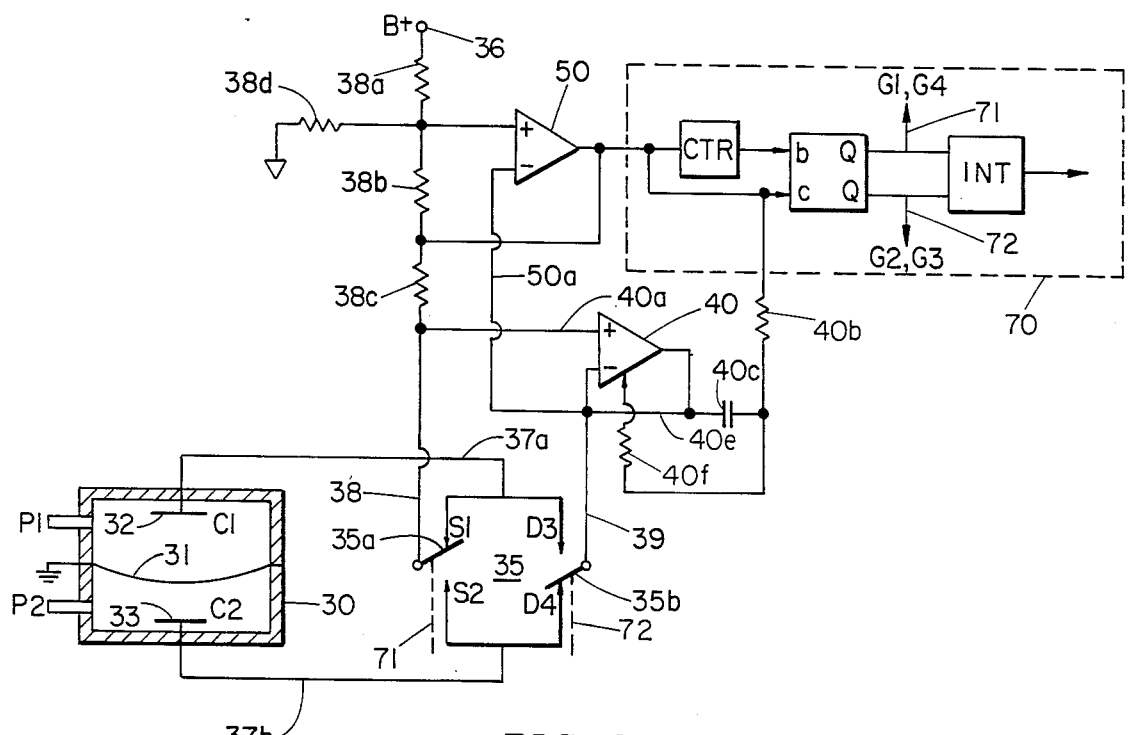
FIG. 3 is a schematic illustration of the system embodying the present invention.

Referring now to FIG. 3, the overall system illustrating one embodiment of the present invention is illustrated. The system includes a differential pressure transducer 30, a switching means 35, an oscillator means 50 and a signal processor 70. The purpose of FIG. 3 is to simplify the explanation of the underlying concepts of this invention.

In the pressure transducer 30 two different fluid pressure inputs designated $P_1$ and $P_2$ are input to the transducer 30. The transducer 30 has a diaphragm 31 which is electrically grounded and constitutes a common capacitor plate. The diaphragm 31 separates the transducer 30 into two pressure tight compartments. In the compartment receiving the pressure $P_1$, the displaceable diaphragm plate 31 and a stationary plate 32 provide capacitance value designated $C_1$. In the compartment receiving the pressure $P_2$, the displaceable diaphragm plate 31 and a stationary plate 33 provide a capacitance value designated $C_2$. The capacitances $C_1$ and $C_2$ are functions of interrelated capacitors in which the capacitance varies as a function of pressure. It should be clearly understood that while precise measurement of pressure values is a difficult proposition, this invention contemplates any system in which interrelated capacitances can be used for obtaining a measurement. The invention also contemplates use of two separate independent capacitances in a downhole tool.

The electrical plates 32 and 33 of the variable capacitors $C_1$ and $C_2$ in the transducer 30 are coupled to the electrical switching means 35. The switching means 35 provides the function of electrically coupling one of the capacitor plates to a unity gain amplifier 40 in one switch position, and in the other switch position reversing the connections. Thus, for one position or condition of the switching means 30 a first capacitor is coupled to a charging current which is supplied by the output of oscillator 50 and the second capacitor is coupled to the gain amplifier 40 and, for the other position or conditions of the switching means, the first capacitor is coupled to the gain amplifier 40 and the second capacitor is coupled to a charging current which is supplied by the output of the oscillator 50. The oscillator means 50 provides for the capacitor charging and discharging through the switching means 35 and provides an output electrical signal to the signal processor 70 as a function of pressure which can be converted to analog or digital representative which are representation of the pressure measured. The signal processor 70 has a control function indicated by the dashed lines 71 and 72 to exercise a switching control on the switch means 35.

As noted before, if the differential pressure transducer 30 typically receives two fluid pressure inputs $P_1$ and $P_2$ and has two capacitance devices which develop variable capacitance values $C_1$ and $C_2$, the capacitance values are a related proportional function of the pressure inputs. The proportional function is based on the relative spacing between the diaphragm capacitor plate 31 and each of the other capacitor plates 32 and 33 which is a function of the differential pressure in the two compartments. Where two independent capacitors are utilized, each capacitor provides a measurement input.

The switching means 35 is schematically illustrated in FIG. 3 only for illustrative purposes and a simplified explanation of the system. A more complete description of the switching means 30 will be made hereafter with respect to FIG. 4. As shown in FIG. 3, the switching means can be considered as an electrical, double throw device with a switch element 35a for connecting to one of a pair of switch poles $S_1$ or $S_2$ and a switch element 35b for connecting to one of a pair of switch poles D3 or D4. The switching element 35a of the switching means 35 is an input/output (I/O) terminal and is connected by conductor 38 to a resistor network comprised of resistors 38a, 38b, 38c and 38d which, in turn is connected to B+. The other switch poles D3 and D4 respectively are connected to the capacitor plates 32 and 33 by the conductors 37a and 37b. The switching element 35b of the switching means 35 is an input/output (I/O) terminal and is connected to an output of the gain amplifier 40 by a conductor 39 and 40e. The switching elements 35a, 35b are arranged to alternate between the respective pairs of switch poles so that the oscillator 50 and the gain amplifier 40 are alternately connected to the capacitor plates 32 and 33.

As shown in FIG. 3, the oscillator means 50 serves the function of converting capacitance measurements from the transducer 30 to a frequency related signal. The signal processor 70 converts the frequency related signals to a suitable form for digital or analog processing.

Before detailing the specifics of the disclosure of the present invention it will be helpful to an understanding of the invention to review certain principles. In this invention, while one of the capacitor devices is coupled to the output of gain amplifier 40 (by conductors 39, 40e), the other capacitor device which performs the measurement is coupled to the oscillator 50. One capacitor device generates a signal with a a first measurable pulse width period as a function of the measurement. The other capacitor also generates a signal with a second measurable pulse width period as a function of the measurement. Upon switching, the measurements of the capacitors switch. By taking a ratio of the two pulse width periods, the respective measurements are always functionally related and since the output of the capacitors is to the same oscillator, the effect of any component variation is consistent and any drift or error in the circuit components is common to both measurements (excluding errors in the switch). By control of the frequency of the measurement interval for each capacitor, the magnitude of deviation for circuit errors is relatively slow changing with respect to the measurement interval and will be rejected to the extent of any common effect for two successive measurements. Also the effect of any circuit error is identical on both measurements for equal capacitance inputs and thus errors become a percent of total reading (relative to zero) which enhances the accuracy of the output.

Figure 4:
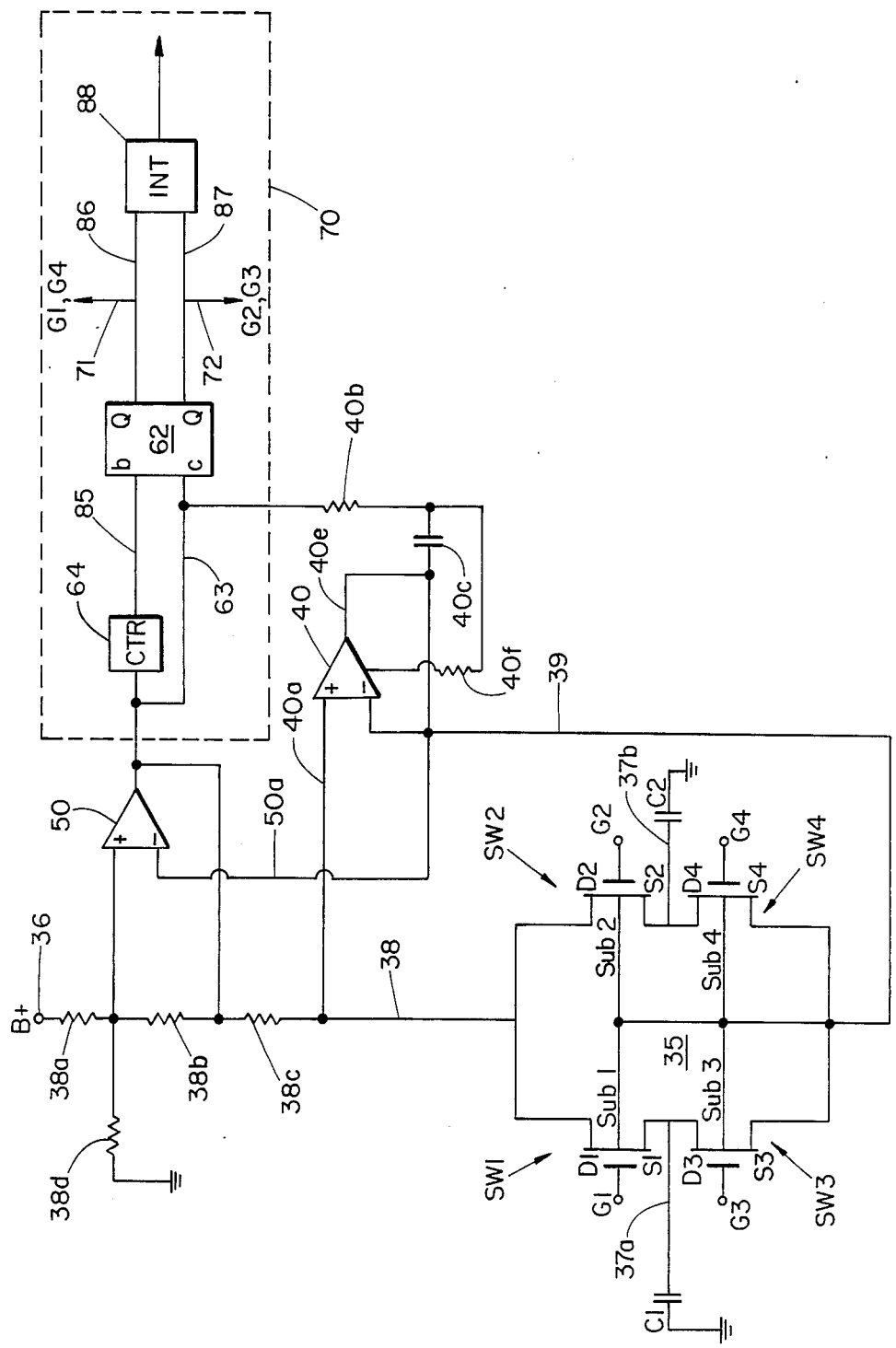
FIG. 4 is a schematic illustration of the system shown in FIG. 3 and illustrating use of FET devices as switches.

In the present invention, as shown in FIG. 4, the FET devices are connected in a downhole double pole, double throw switching array of FET's. As shown in FIG. 4, $SW_1$, $SW_2$, $SW_3$, $SW_4$, are FET devices which have sources $S_1$–$S_4$, drains $D_1$–$D_4$ substrates Sub1–Sub4 and Gates $G_1$–$G_4$. When Gates $G_1$ and $G_4$ are actuated, the switches $SW_1$ and $SW_4$ conduct or are "on" while the switches SW2 and SW3 are "off". When the Gates G2 and G3 are actuated, the switches SW2 and SW3 conduct or are "on" while the switches SW1 and SW4 are "off".

Between the drain $D_3$ of switch $SW_3$ and the source $S_1$ of the switch $SW_1$ is the capacitor $C_1$ and between the drain $D_4$ of switch $S_4$ and the source $S_2$ of switch $SW_2$ is the capacitor $C_2$. When the switches $SW_1$ and switch $SW_4$ are "on", a charging current from the output of oscillator 50 is supplied via the resistor 38c to charge the capacitor $C_1$. The resistors 38a, 38b and 38d can be of equal value for convenience. When the switches $SW_2$ and $SW_3$ are "on", a charging current from output of the oscillator 50 is supplied via the resistor 38c to charge the capacitor $C_2$.

Figure 5:
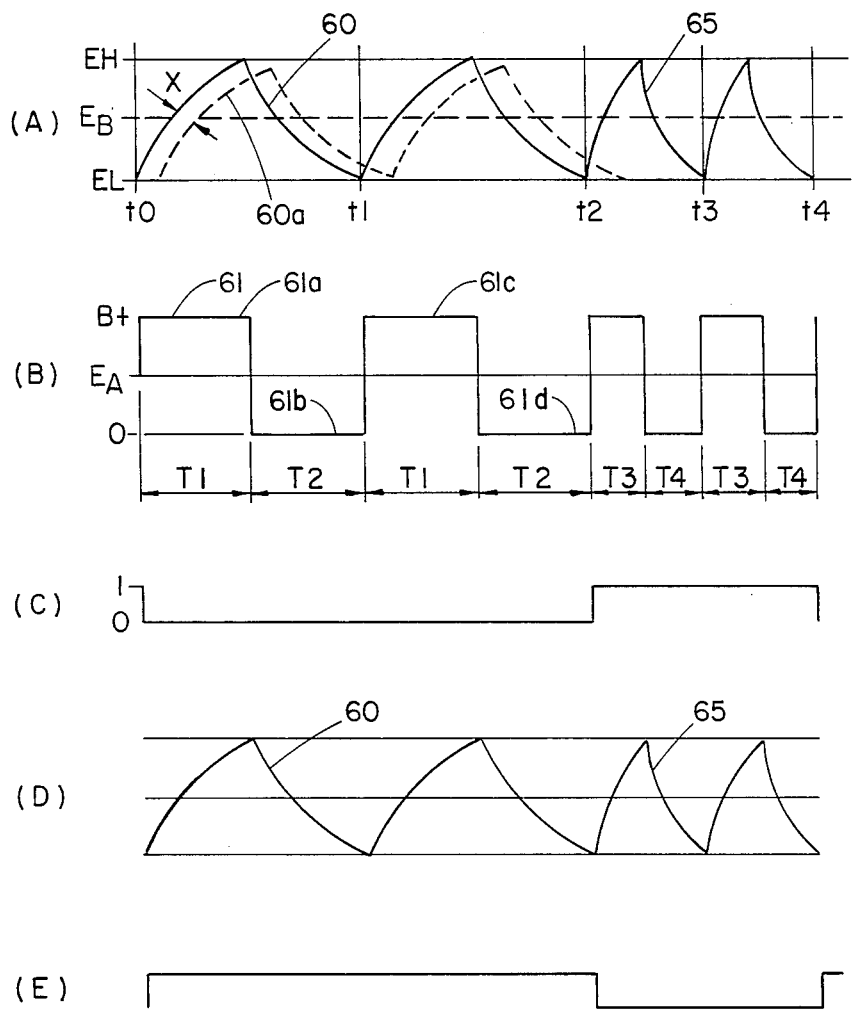
FIGS. 5 A-E are waveforms for illustration purposes.

The oscillator 50 which is a comparator circuit is coupled to the resistor network and to the drains $D_1$ and $D_2$ of the switches $SW_1$ and $SW_2$ and has upper and lower trigger levels $E_L$ and $E_H$ as established by resistors 38a, 38b and 38d. In operation, the voltage of capacitor $C_1$, for example, builds up from a level $E_L$ to $E_H$ during a time interval and then the comparator senses the reversal of its input drive since the positive input is connected to $E_H$ and its negative input is connected through the amplifier 40 to the voltage on the capacitor $C_1$. The reversal of the input signal to the oscillator 50 causes its output to switch low thus dropping $E_H$ to $E_L$ and charging the capacitor $C_1$ in the opposite direction through the resistor 38c. The operation then repeats so long as the capacitor $C_1$ is connected to the oscillator 50. As shown in FIG. 5A, the input wave form 60 of the capacitor $C_1$ between a time $t_0$ and $t_2$ has two cycles of a signal with a given frequency which is a function of the time interval or period per cycle. The output of the oscillator 50 is a square wave form 61, as shown in FIG. 5B, and is supplied to the clock input C of a D type flip-flop circuit 62 via a conductor 63. The flip-flop 62 triggers on the rising edge of a positive input pulse to provide a "0" state output in one condition and is set to another condition by a D input to provide a "1" state output. A counter 64 is coupled to the oscillator 50 and the flip-flop 62. The counter 64 is set to trigger on a given number of positive transistions in pulses. For purposes of explanation, if the counter 64 triggers on two pulses, then the pulses 60a, 60b, 60c and 60d are counted and the counter 64 operates the D input of the flip-flop to go to a "1" state until the counter counts two more pulses (See FIG. 5C). It is apparent that from the time period $t_0$ to $t_2$, two cycles of measurement occurred each having positive and negative duty cycles $T_1$ and $T_2$ which are equal in time to one another. Thus the average voltage (FIG. 5B) is equal to $E_A$. When the counter 64 triggers the flip-flop 62 then the Gates $G_1$ and $G_4$ and the Gates $G_2$ and $G_3$ change operational stages and the capacitor $C_2$ is then connected to the oscillator 50.

When the capacitor $C_2$ is connected to the oscillator 50 it has a different capacitance value. As shown in FIGS. 5A and 5D, in the time frame of $t_2$ to $t_4$, two cycles of measurement can occur from the capacitor $C_2$, each having a positive and negative duty cycle $T_3$ and $T_4$ where the duty cycles $T_3$ and $T_4$ are equal to one another. Thus the average voltage (FIG. 5B) is $E_A$. The counter 64 counts two pulses and enables the next pulse to switch the states of the flip-flop from a "1" to "0".

As can be noted, the signal 60 from capacitor $C_1$ is at one frequency and the signal 65 from the capacitor $C_2$ is at a second frequency. Each frequency is a function of a capacitance measurement and by measuring the time periods for the "0" and "1" states, the parameter measurements can be determined.

Figure 6:
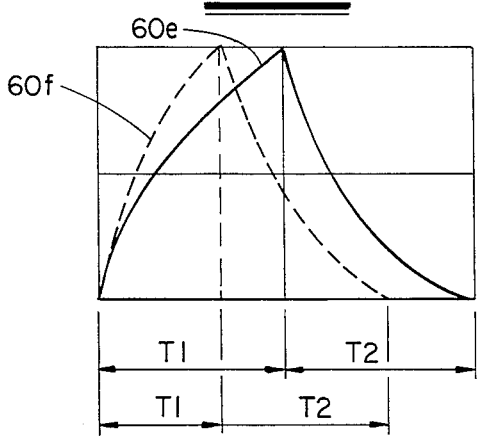
FIG. 6 is a waveform illustrating the effect of current leakage on FET devices.

It will be appreciated that in a well bore if the temperature increases, additional current will affect the charging current to a capacitor. For example, positive leakage will add to the positive charging current and subtract from the negative charging current. The total charging period for example, ($T_1 + T_2$ or $T_3 + T_4$) may remain unchanged or may change. In either case, however, the duty cycle changes, i.e., the relationship of $T_1$ to $T_2$ and of $T_3$ to $T_4$. In this case as shown in FIG. 6 the normal charging curve 60e is changed to the dashed line curve 60f where the $T_1$ period is shorter and the $T_2$ period is longer. Thus, a change in the equality of the duty cycles is symptomatic of current leakage.

In the present invention, the charging current of the oscillator 50 is applied to a unity gain amplifier 40 via a conductor 40a. The output of the amplifier 40 is coupled by a conductor means 40e and 39 to the substrates Sub1-Sub4 and to the sources $S_3$ and $S_4$. The output of the oscillator 50 is connected to conductor 39 by a capacitance 40c and resistor 40b in series. The capacitor 40c and the resistor 40b average the voltage (except for the offset voltage X) output from the oscillator 50 with respect to the output of the amplifier 40 on conductor 40e. If the duty cycles $T_1$ and $T_2$ or duty cycles $T_3$ and $T_4$ are equal then there is no current leakage between $SW_1$ and $D_1$ or Sub2 and $D_2$. The "on" Switches $SW_1$ and $SW_4$ are conducting so that both capacitors $C_1$ and $C_2$ are being charged to the same voltage and the relationships of substrates to sources and the relationship of sources to drains are maintained constant through the charging duty cycle from $E_L$ to $E_H$ in the oscillator 50.

As shown in FIG. 5A, the input waveform 60 to the amplifier 40, when the duty cycles are equal, produces an output waveform 60a which tracks the input waveform 60 and may be offset by value "X" which is just sufficient to introduce a leakage to the substrates in an opposite polarity to eliminate the effects of leakage current. The substrate appears as a diode and at high temperatures can conduct current in either direction and thus adjustment of the amplifier 40 can occur in both directions.

Should an FET leak current because of temperature then the average value $E_A$ (FIG. 5B) will adjust relative to the average value $E_B$ (FIG. 5A) to produce a d.c. adjustment current into the offset control resistor 40f to the amplifier 40 via the resistor 40b to compensate for the leakage current. This adjusts the offset of the amplifier 40 to bring the output voltage on the conductor 40e to the source/substrate and source/drain relationships to a value above or below waveform 60 (FIG. 5A) where the duty cycles ($T_1$ and $T_2$ or $T_3$ and $T_4$) are approximately equal. Thus the potentials across the switches float with the voltage charge in the capacitors $C_1$ and $C_2$. The capacitor 40c serves to remove any A.C. component of waveform 61 with respect to waveform 60.

The significance of the capacitors $C_1$ and $C_2$ being charged at the same rate is that when the flip-flop 62 between capacitors $C_1$ and $C_2$ switches, the voltage on both capacitors is very nearly equal so that the transition voltage to the oscillator 50 is not substantial.

The outputs Q and Q of flip-flop 62 are transmitted via conductors 86, 87 to an output processor 88 which can be a conventional analog integrator. The flip-flop 62 also has one output Q coupled via conductor 72 to gates $G_2$ and $G_3$ and the other output Q coupled via conductor 71 to gates $G_1$ and $G_4$.

The resistor 40b and capacitor 40c are chosen so as to provide adequate filtering of the A.C. components and adequate current to drive the offset input. The amplifier 40 generates an offset voltage when the duty cycles are unequal to adjust the leakage of the switches for equal duty cycles. The offset signal of the amplifier 40 is the difference between the two inputs to the amplifier.

It will be apparent to those skilled in the art that various changes may be made in the invention without departing from the spirit and scope thereof and therefore the invention is not limited by that which is enclosed in the drawings and specifications but to as indicated in the appended claims.

I claim:

1. Apparatus for processing capacitance measured parameters including:

double pole, double throw FET switch means coupled to first and second measuring capacitors for switching said first measuring capacitor between first and second I/O terminals and for switching said second measuring capacitor between the second and the first I/O terminals and where the measuring capacitors can be charged and discharged through the switch means, said FET switch means having substrates connected to said second I/O terminal, unity gain amplifier means having an input connect to said first I/O terminal and having an output connected to said second I/O terminal, said unity gain amplifier means having control means for adjusting the output signal of said unity gain amplifier means, oscillator means coupled to said I/O terminals for alternately coupling to one of said measuring capacitors and for providing a frequency output signal with duty cycles which are functionally related in a first predetermined relationship relative to the time for charging and for discharging of a measuring capacitor under conditions of no current leakage in the switch means and where the occurrence of current leakage in the switch means causes the duty cycles to have a second relationship relative to the time for charging and for discharging of a measuring capacitor, averaging means interconnecting said oscillator means and said unity gain amplifier means for converting the duty cycle of the frequency output signal to a control signal for input to said control means so that said output signal of said unity gain amplifier means is applied to the substrates of said switch means for adjusting the duty cycle of the frequency output signal to said first predetermined relationship whenever current leakage occurs in the switch means.

2. The apparatus as set forth in claim 1 and further including means for processing said frequency output signal for providing a different digital output signal for each of said measuring capacitors.

3. The apparatus as set forth in claim 2 and further including counter means responsive to said frequency output signals for operating said means for processing in response to a predetermined number of duty cycles.

4. The apparatus as set forth in claim 2 wherein said switch means are switched in response to a digital output signal.

5. Apparatus for processing capacitance measured parameters including,

FET switch means comprised of four FET switch elements $SW_1$, $SW_2$, $SW_3$, and $SW_4$ where each switch element has a source, a drain, a gate and a substrate and where $SW_1$ and $SW_3$ are connected in series and $SW_2$ and $SW_4$ are connected in series and the drains of $SW_1$ and $SW_2$ are interconnected at a first I/O terminal and the sources of $SW_3$ and $SW_4$ together with all of the substrates are interconnected at a second I/O terminal, first capacitor means connected to said switch means between switch elements $SW_1$ and $SW_3$, second capacitor means connected to said switch means between switch elements $SW_2$ and $SW_4$, oscillator means for providing frequency output signal as a function of charging and discharging of a capacitor means and for controlling the charging and discharging of a capacitor means, resistor network means for establishing an voltage operating range for said oscillator, unity gain amplifier means connected between said I/O terminals with an output connected to said second I/O terminal and to said oscillator means, said amplifier means having an offset control, means interconnecting the output of said oscillator means to said offset control whereby a change in the duty cycle of the frequency output signal from a predetermined relationship will produce a correction offset control for maintaining said predetermined relationship.

6. A method of offsetting current leakage in FET devices where the FET devices are connected as double pole, double throw FET switch means, and where the FET devices have a source, a drain, a gate and a substrate and where the FET devices when subjected to temperatures such as found in borehole environments develop current leakage between the source and drain and between the substrate and drain, the method including the steps of:

switching said switch means to alternately couple an input from independent capacitance means to signal generating means via said switch means where said signal generating means produces an output signal having a duty cycle with a given relationship at conditions of no current leakage in the FET devices;

sensing any change in said given relationship as a result of current leakage in an FET device for developing a correction current flow; and adjusting the input to said signal generating means by adjusting the corrective current flow into an FET device relative to current leakage for offsetting the effect of current leakage and for maintaining said given relationship.

7. An apparatus for offsetting current leakage in FET devices utilized in a downhole well tool including:

FET devices connected together as a double pole, double throw switch means where such FET devices have a source, a drain, a gate and a substrate and where current leakage occurs between a source and drain and a substrate and drain when the FET devices are subjected to high temperatures in a well bore environment;

independent capacitance means and signal generating means coupled to said switch means where operation of said switch means alternately couples an input of the respective capacitance means to said signal generating means for generating an output signal having a duty cycle with a given relationship at conditions of no current leakage in the FET devices;

means for sensing any change in said given relationship as a result of current leakage in an FET device for developing an offset current flow; and means for applying said offset current flow to said FET devices for offsetting any effect of current leakage for maintaining said given relationship.

\* \* \* \* \*